H. H. VAUGHAN.
LATERAL MOTION DEVICE FOR RAILWAY TRUCKS.
APPLICATION FILED SEPT. 22, 1913.
1,099,890.
Patented June 9, 1914.
2 SHEETS—SHEET 1.
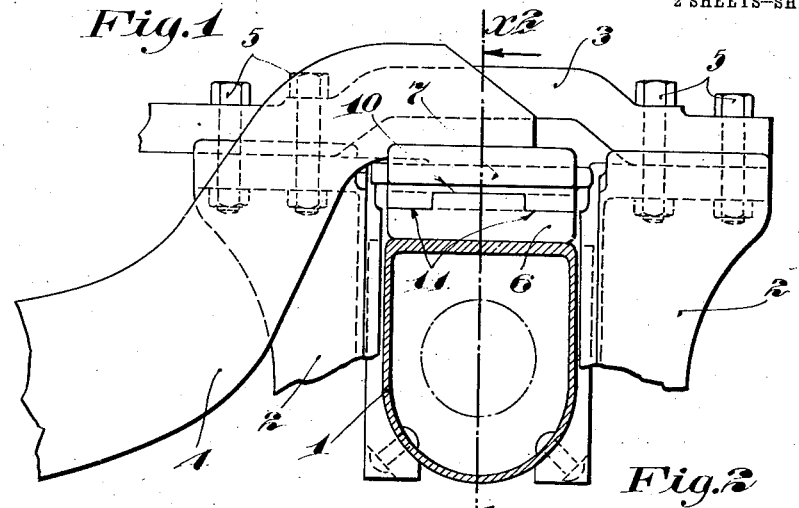
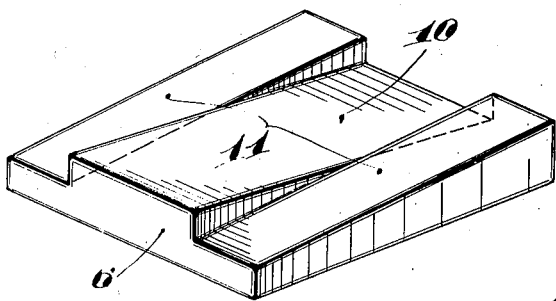
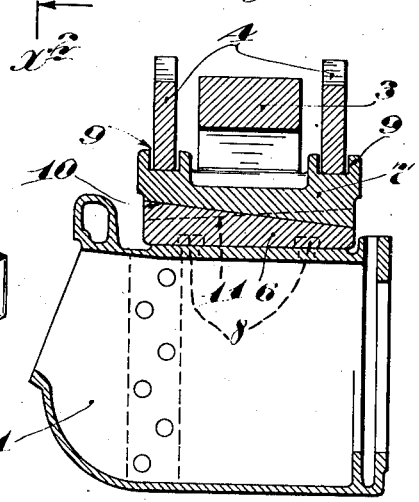
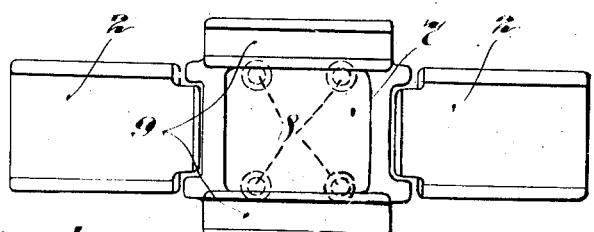
Witnesses:
Geo. Knutson
E. C. Skinkle
Inventor:
H. H. Vaughan
By his Attorneys:
Williamson Merchant H. H. VAUGHAN.
LATERAL MOTION DEVICE FOR RAILWAY TRUCKS.
APPLICATION FILED SEPT. 22, 1913.
1,099,890.
Patented June 9, 1914.
2 SHEETS—SHEET 2.
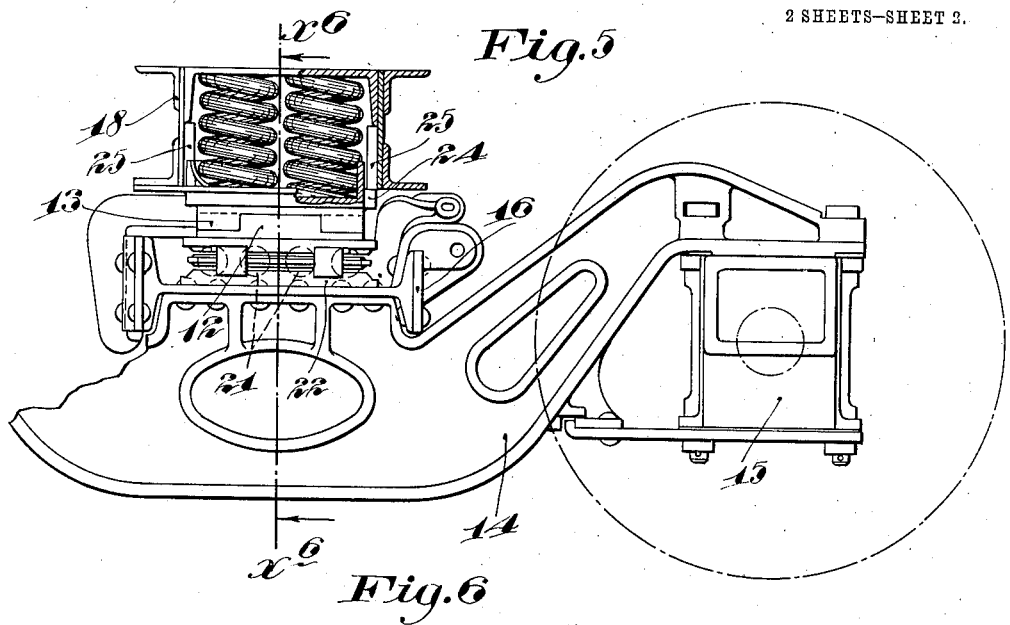
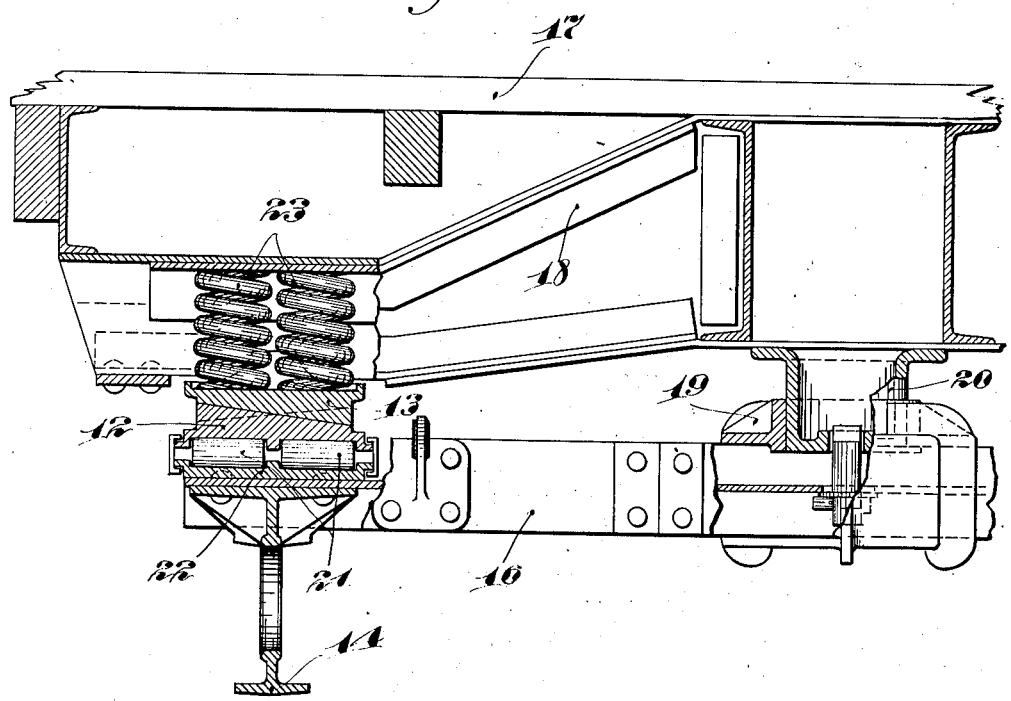
Witnesses:
Geo. Knutson
E. C. Skinkle
Inventor:
H. H. Vaughan
By his Attorneys,
Williamson & Merchant

UNITED STATES PATENT OFFICE.

HENRY H. VAUGHAN, OF MONTREAL, QUEBEC, CANADA.

LATERAL-MOTION DEVICE FOR RAILWAY-TRUCKS.

1,099,890.

Specification of Letters Patent.

Patented June 9, 1914.

Application filed September 22, 1913. Serial No. 791,061.

*To all whom it may concern:*

Be it known that I, HENRY H. VAUGHAN, a citizen of the United States, residing at Montreal, in the county of Hochelaga and Province of Quebec, Canada, have invented certain new and useful Improvements in Lateral-Motion Devices for Railway-Trucks; and I do hereby declare the following to be a full, clear, and exact description of the invention, such as will enable others skilled in the art to which it appertains to make and use the same.

My invention has for its object to provide a simple and efficient lateral motion device for railway trucks, and to such ends, generally stated, the invention consists of the novel devices and combinations of devices hereinafter described and defined in the claims.

The well known function of lateral motion devices for railway trucks, is to permit lateral movements of the body in respect to the wheels, and to thereby reduce the frictional contact between the wheel flanges and the rails. When these lateral motion devices are incorporated in car trucks, they are sometimes applied between the truck side frames and a truck bolster, said truck bolster being capable of endwise movement transversely of the truck. In some instances, they are placed between the journal boxes and truck side frames; and in still other instances, they are interposed between the bolsters of the car body and the truck side frames, the truck bolsters being dispensable. In the application of such lateral motion devices, to tender trucks, for example, they are advisably interposed between the journal boxes and the equalizing bars of the side frames. Experience has shown, that a common fault in these lateral motion devices is found in the fact that they have too little normal stability, or, in other words, offer too slight resistance against lateral movements when in their central or medial positions, so that the car or truck body will be given incessant lateral swaying movement not at all desirable.

My improved lateral motion device has normally such frictional resistance to lateral movement of the car or truck body, in respect to the truck wheels that under ordinary running conditions on a straight or nearly straight track, they will remain dormant or solid, but under considerable lateral stress, will slip or yield to prevent excessive thrust of the wheel flanges against the rails. This is accomplished in the present instance, by the use of opposed oblique frictional engaging members therein designated as wedge plates.

In the accompanying drawings which illustrate the invention, like characters indicate like parts throughout the several views.

Referring to the drawings: Figure 1 is a fragmentary view in side elevation, with some parts broken away and with some parts sectioned, showing one of my improved lateral motion devices applied to a tender truck; Fig. 2 is a vertical section taken on the line $x^2$ $x^2$ on Fig. 1; Fig. 3 is a plan view of certain of the parts shown in Fig. 1, some of the parts being removed; Fig. 4 is a perspective view showing one of the wedge plates of the lateral motion devices; Fig. 5 is a view chiefly in side elevation, but with some parts sectioned and with some parts broken away, showing my improved lateral motion device applied between the side frame and body bolster of a car; and Fig. 6 is a transverse vertical section taken approximately on the line $x^6$ $x^6$ on Fig. 5.

Referring first to the construction illustrated in Figs. 1 to 4, inclusive, which illustrate the improved lateral motion device applied to a tender truck, the numeral 1 indicates a journal box, the numeral 2 the journal box pedestals, the numeral 3 the top bar of the truck side frame, and the numeral 4, the equalizer or equalizing bars. The journal box 1 is mounted for vertical movements but allowed a restricted amount of lateral movement in respect to the pedestals 2. The top bar 3 is, as shown, rigidly secured to the upper ends of the pedestals 2, by nut-equipped bolts 5. The equalizing bars 4 support the truck springs in the usual or any suitable way, not shown. Usually, they are arranged in pairs and seated at their ends on top of the journal boxes. In the present instance, however, my improved lateral motion devices are interposed between the journal boxes and the ends of the said equalizer bars, and each such lateral-motion device comprises a lower wedge plate 6, and an upper wedge plate 7, the former of which, as shown, are anchored on the tops of the journal boxes 1, by dowel pins 8, and the latter of which is provided with top channels 9 in which the ends of the equalizing bars 4 are seated and held against lateral movement with respect to the pedestals 2. The wedge plates 6 and 7 have opposed oblique frictionally engaging surfaces. The best arrangement of these opposed oblique surfaces is afforded by providing each bearing plate with reversely inclined bearing surfaces 10 and 11, which surfaces transversely intersect approximately at the transverse centers of the said bearing plates. By this arrangement, long bearing surfaces are afforded and the said bearing surfaces are caused to interlock, so that the wedge plates 6 and 7 cannot shift in respect to each other, either forwardly or rearwardly. With this arrangement, as is evident, the weight of the load transmitted to the upper wedge plate 7, through the equalizing bars 4, will tend to maintain the said wedge plates 6 and 7 in central or intermediate normal positions, shown in Fig. 2, with the oblique bearing surfaces 10 and 11 of both wedge plates in engagement. Obviously, when the truck wheels, journal box and lower wedge plate 6 are moved toward the right, in respect to Fig. 2, the oblique surfaces 11 of the two wedge plates will be separated, and there will be a sliding contact between the oblique bearing surfaces 10; and on the other hand, that when the wheels, journal box and lower wedge plates 6 are moved toward the left in respect to Fig. 2, the oblique surface 10 will be separated and the sliding friction will take place between the oblique surfaces 11 of the two wedge plates. As is evident, the greater the inclination of the bearing surfaces 10 and 11, the greater will be the force required to move the one wedge plate, in respect to the other, and the greater the tendency of the two wedge plates to assume normal intermediate positions under the weight of the load. The inclination of these surfaces may, therefore, be varied to meet the requirements of the particular service in which they are applied.

In Figs. 5 and 6, I have shown substantially the same wedge plates as illustrated in Figs. 1 to 4, inclusive, incorporated in, or directly associated with a combined lateral and radial motion device that is directly interposed between the truck side frame and the body bolster of a car. In this arrangement, the said upper and lower wedge plates, which have the same opposed oblique bearing surfaces as the bearing plates 6 and 7, are indicated, respectively, by the numerals 12 and 13. Of the parts of the truck shown in said Figs. 5 and 6, the numeral 14 indicates the truck side frames, the numeral 15 the journal boxes, the numeral 16, a transom rigidly connecting the truck side frames, the numeral 17 the car body, the numeral 18 the car body bolster, the numeral 19 a center pivot casting slidably mounted on the transom 16, and the numeral 20 a depending hub centrally secured to the body bolster 18, and mounted for both pivotal and for vertical movements in the sliding casting 19. The said parts 14 and 20, just noted, are shown as of a construction disclosed and claimed in the John C. Barber application, Serial Number 760,611, filed of date, April 12th, 1913, entitled "Car trucks." The lower wedge plate 12 is seated on radial motion rollers 21, which, in turn, are mounted to travel on a lower bearing plate 22, shown as riveted in the web of the transom 16 and to flanges of the side frame 14. The rollers 21 run on grooves in the members 12 and 22, so that the said lower wedge plate 12 will partake of the lateral movements of the truck frame. The truck springs 23 are interposed between the upper wedge plate 13 and the body bolster 18, and the said wedge plate 13, while free for vertical movements in respect to the said body bolster, is held for movements therewith, transversely of the truck, this, as shown, being accomplished by providing the said wedge plate 13 with upturned end arms 24 (see Fig. 5), that work in vertical guides 25 secured on the side plates of the said body bolster.

The expression "wedge plates" is herein used in a broad sense to include the opposed or coöperating bearing members of the lateral motion device and is not intended to limit these members to flat form nor to elements separate and distinct from other elements.

What I claim is:

1. In a railway truck, lateral motion devices comprising frictionally engaging upper and lower wedge plates arranged in coöperating pairs on opposite sides of the truck, each wedge plate having reversely inclined frictional surfaces, the said lower wedge plates partaking of the lateral movements of the journal boxes, and the upper wedge plates partaking of the lateral movements of the truck body.

2. A lateral motion device for railway trucks, comprising opposed wedge plates, each having reversely inclined frictional surfaces intersecting at their intermediate portions, and all of which friction surfaces are normally in engagement.

3. In a railway truck, lateral motion side bearings comprising coöperating upper and lower wedge plates, each having reversely inclined intermediately intersecting friction surfaces, all of which inclined friction surfaces of the two coöperating plates are normally in engagement.

4. In a railway truck, lateral motion side bearings comprising coöperating upper and lower wedge plates, each having reversely inclined intermediately intersecting friction surfaces, all of which inclined friction surfaces of the two coöperating plates are normally in engagement, the said lower wedge plates partaking of the lateral movements of the journal boxes, and the said upper wedge plates partaking of the lateral movements of the truck body.

In testimony whereof I affix my signature in presence of two witnesses.

HENRY H. VAUGHAN.

Witnesses:
GORDON G. COOKE,
WILLIAM J. C. HEWETSON.